(12) United States Patent
Fitzwater et al.

(10) Patent No.: US 9,956,981 B1
(45) Date of Patent: May 1, 2018

(54) CANOPY POLE SYSTEM

(71) Applicant: RADIO FLYER INC., Chicago, IL (US)

(72) Inventors: Jason Fitzwater, Chicago, IL (US); Collin Ostergaard, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days. days.

(21) Appl. No.: 15/338,900

(22) Filed: Oct. 31, 2016

(51) Int. Cl.
| | |
|---|---|
| *B62B 9/14* | (2006.01) |
| *E04H 15/30* | (2006.01) |
| *E04H 15/64* | (2006.01) |
| *E04H 15/06* | (2006.01) |
| *E04H 15/54* | (2006.01) |
| *B62B 7/00* | (2006.01) |
| *E04H 15/60* | (2006.01) |

(52) U.S. Cl.
CPC ............ *B62B 9/142* (2013.01); *E04H 15/06* (2013.01); *E04H 15/54* (2013.01); *E04H 15/60* (2013.01); *E04H 15/64* (2013.01); *B62B 7/00* (2013.01)

(58) Field of Classification Search
CPC ......... E04H 15/06; E04H 15/34; E04H 15/60; E04H 15/64; Y10T 403/32467; Y10T 403/32475; Y10T 403/32483; B62B 3/007; B62B 3/1436; B62B 5/003; B62B 9/14; B62B 9/142; B62B 9/147; B62B 7/00
USPC ........ 135/88.01, 88.02, 88.1, 141, 142, 912, 135/119, 120.4, 909, 24, 25.4, 75, 114, 135/120.2; 280/642, 647, 657, 658; 296/163
See application file for complete search history.

(56) References Cited

U.S. PATENT DOCUMENTS

| | | | | |
|---|---|---|---|---|
| 579,373 | A * | 3/1897 | Wolbrecht ............ | E04H 15/322 135/114 |
| 1,734,170 | A * | 11/1929 | Leffert .................... | E04H 15/60 135/114 |
| 2,385,716 | A * | 9/1945 | Mahaffey .............. | E04H 15/322 135/118 |
| 2,714,387 | A * | 8/1955 | Meldrum ................ | B63B 17/02 114/361 |
| 2,777,454 | A * | 1/1957 | Kramer ................. | E04H 15/003 135/118 |

(Continued)

OTHER PUBLICATIONS

Radio Flyer Canopy Assembly Instructions, at least as early as Jun. 29, 2015.

(Continued)

*Primary Examiner* — Robert Canfield
(74) *Attorney, Agent, or Firm* — McDermott Will & Emery LLP

(57) ABSTRACT

A canopy assembly is provided for a ride-on vehicle including a canopy and a canopy frame assembly. The canopy frame assembly has a housing, a release member connected to the housing, a canopy support extending through the housing, and a connector connected to the canopy support. The canopy support has a first stop adjacent a first end of the canopy support and a second stop adjacent a second end of the canopy support. The release member engages the canopy support at the first stop to maintain the canopy support in the first position, wherein the canopy support is retracted, and at the second stop to maintain the canopy support in the second position, wherein the canopy support is in the extended position.

20 Claims, 10 Drawing Sheets

(56) References Cited

U.S. PATENT DOCUMENTS

| | | | | |
|---|---|---|---|---|
| 3,425,428 A | * | 2/1969 | Schwartz | E04H 15/60 135/114 |
| 3,593,997 A | * | 7/1971 | Boehner | A63B 71/022 135/120.4 |
| 4,083,601 A | * | 4/1978 | McBeth | A47C 7/66 135/115 |
| 4,815,784 A | | 3/1989 | Zheng | |
| 4,926,893 A | * | 5/1990 | Klopfenstein | E04H 15/001 135/116 |
| 5,041,043 A | | 8/1991 | Hoke | |
| 5,232,005 A | | 8/1993 | Mitchell | |
| 5,331,993 A | * | 7/1994 | Billbury | B63B 17/02 114/361 |
| D357,050 S | * | 4/1995 | McClain | D21/840 |
| 5,403,239 A | | 4/1995 | Zimmers | |
| 5,560,383 A | * | 10/1996 | Fuller | E04H 15/58 135/88.01 |
| 5,632,290 A | * | 5/1997 | Ling Kuo | A45B 25/143 135/24 |
| 5,809,700 A | * | 9/1998 | Roush | E04H 15/003 135/117 |
| 5,842,732 A | | 12/1998 | Daggett et al. | |
| 6,250,320 B1 | * | 6/2001 | Roth | E04H 12/2215 135/118 |
| 6,260,566 B1 | | 7/2001 | LaFave | |
| 6,263,893 B1 | * | 7/2001 | Spinella | B60J 7/10 135/119 |
| 6,446,981 B1 | | 10/2002 | Wise et al. | |
| 6,508,262 B1 | * | 1/2003 | Takayama | E04H 15/50 135/114 |
| 6,684,893 B2 | * | 2/2004 | Kuo | A45B 25/143 135/24 |
| 6,718,600 B1 | * | 4/2004 | Gillis | E04H 15/64 135/119 |
| D551,723 S | | 9/2007 | Schlegel | |
| D551,724 S | | 9/2007 | Seckel | |
| 7,493,908 B2 | | 2/2009 | Carter et al. | |
| RE40,657 E | * | 3/2009 | Suh | E04H 15/46 135/114 |
| 7,628,369 B2 | * | 12/2009 | Chen | F16B 7/105 248/354.3 |
| 7,673,643 B2 | * | 3/2010 | Seo | E04H 15/32 135/120.1 |
| 7,699,091 B2 | | 4/2010 | Fisher, Sr. | |
| 7,980,519 B2 | * | 7/2011 | Chen | A47B 9/14 135/140 |
| 8,011,686 B2 | | 9/2011 | Chen et al. | |
| 8,220,824 B2 | | 7/2012 | Chen et al. | |
| 8,342,544 B1 | | 1/2013 | Blewett et al. | |
| 8,388,015 B2 | | 3/2013 | Chen | |
| 8,439,426 B2 | * | 5/2013 | Dempsey | B60P 3/341 296/173 |
| 8,746,267 B2 | * | 6/2014 | Lovley, II | E04H 15/50 135/114 |
| 8,955,855 B2 | | 2/2015 | Herlitz | |
| 9,022,413 B2 | | 5/2015 | Liu | |
| D731,166 S | | 6/2015 | Ma | |
| 9,056,621 B1 | * | 6/2015 | Jin | B62B 3/027 |
| 9,073,564 B2 | | 7/2015 | Yang et al. | |
| 9,085,311 B1 | | 7/2015 | Chen | |
| 9,145,154 B1 | | 9/2015 | Horowitz | |
| 9,193,371 B2 | | 11/2015 | Sherman | |
| 9,211,897 B2 | | 12/2015 | Yang et al. | |
| 9,248,072 B2 | * | 2/2016 | Wu | A61H 3/04 |
| 9,376,133 B2 | | 6/2016 | Sun | |
| 2002/0179134 A1 | * | 12/2002 | Suh | E04H 15/46 135/141 |
| 2003/0062074 A1 | * | 4/2003 | Kuo | A45B 25/143 135/24 |
| 2003/0183257 A1 | * | 10/2003 | Lee | A45B 25/06 135/24 |
| 2005/0249545 A1 | * | 11/2005 | Tsai | E04H 15/50 403/109.3 |
| 2006/0062632 A1 | * | 3/2006 | Jang | E04H 15/46 403/109.6 |
| 2006/0169311 A1 | * | 8/2006 | Hwang | E04H 15/50 135/142 |
| 2006/0254635 A1 | * | 11/2006 | Matheus | E04H 15/06 135/88.05 |
| 2007/0003361 A1 | * | 1/2007 | Wang | F16B 7/105 403/109.3 |
| 2007/0182198 A1 | | 8/2007 | Michelau | |
| 2008/0011345 A1 | | 1/2008 | Mohns | |
| 2009/0156094 A1 | | 6/2009 | Seckel et al. | |
| 2009/0206211 A1 | | 8/2009 | Goodman | |
| 2010/0090444 A1 | * | 4/2010 | Chen | B62B 3/007 280/651 |
| 2010/0122718 A1 | * | 5/2010 | Lah | A45B 9/00 135/75 |
| 2010/0156069 A1 | * | 6/2010 | Chen | B62B 3/007 280/639 |
| 2013/0015629 A1 | * | 1/2013 | Bengtzen | A45C 9/00 280/30 |
| 2014/0030012 A1 | * | 1/2014 | Lee | F16B 7/105 403/326 |
| 2014/0251394 A1 | | 9/2014 | Ma | |
| 2015/0052662 A1 | | 2/2015 | Taylor | |
| 2015/0083174 A1 | | 3/2015 | Desyr | |
| 2015/0086290 A1 | | 3/2015 | Bisset | |
| 2015/0151771 A1 | * | 6/2015 | Jin | B62B 3/027 280/651 |
| 2015/0329135 A1 | * | 11/2015 | Sun | B62B 9/24 280/649 |
| 2016/0324324 A1 | | 11/2016 | Wilkerson Altonen | |

OTHER PUBLICATIONS

Radio Flyer Model #3100/3175, Canopy Set Up Instructions, at least as early as Jun. 29, 2015.

\* cited by examiner

CANOPY POLE SYSTEM

FEDERALLY SPONSORED RESEARCH OR DEVELOPMENT

Not Applicable.

TECHNICAL FIELD

The present disclosure relates generally to a canopy system, and more specifically to a telescoping canopy pole system for a ride on toy, such as a wagon.

BACKGROUND

Typically, when riding in ride-on vehicles, such as wagons, children are exposed to weather elements, including the sun. It is commonly understood that young children can be easily harmed by sunburns and other damaging effects of the sun. As such, parents typically provide suitable clothing for their children, such as long sleeve shirts and hats, to minimize their exposure to the sun. However, in particularly hot and humid climates, long sleeve shirts and hats can be very uncomfortable, thereby triggering other health issues such as heat exhaustion. Parents also typically apply sunscreens on their children, which help to provide protection against the potentially harmful effects ultraviolet rays. Because parents know that the effectiveness of sunscreens does not last, they tend to reapply them on their children's skin on a regular basis. Unfortunately, sunscreens fail to provide sufficient skin protection when long periods of sun exposure are involved.

In order to overcome the above-discussed sun exposure issues when children are seated in standard wagons, canopies attachable to wagons were developed. Canopies on wagons also provide benefit should users get caught in the rain unexpectedly. However, a wagon canopy is typically adapted to be attached to a canopy frame through a number of cross support members that are joined to each other and to a number of vertical support members or poles. As such, this canopy may not collapse well for storage and transport. Additionally, other canopies require special attachment mechanisms to connect the canopy poles and frame to the wagon body. While such canopy systems according to the prior art provide a number of advantages, they nevertheless have certain limitations, including often having complex frames and attachment systems. Accordingly, there is a need for a canopy assembly that can be quickly and easily assembled, and which is simple to use. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to one embodiment, the disclosed subject technology relates to a canopy assembly for a ride-on vehicle comprising a canopy and a canopy frame assembly. In one embodiment, the canopy frame assembly comprises a housing, a release member connected to the housing, a canopy support extending through the housing, and a connector connected to the canopy support. The canopy support has a first stop adjacent a first end of the canopy support and a second stop adjacent a second end of the canopy support. The release member engages the canopy support at the first stop to maintain the canopy support in the first position, wherein the canopy support is retracted, and at the second stop to maintain the canopy support in the second position, wherein the canopy support is in the extended position.

According to another embodiment, the disclosed subject technology relates to a canopy assembly for a ride-on vehicle, comprising: a canopy; and, a canopy frame assembly comprising a housing, a release member connected to the housing, a canopy support extending through the housing, and a connector connected to the canopy support, wherein the housing has a first end and a second end, and a longitudinal bore extending through the housing from the first end to the second end, wherein the housing has an opening in a sidewall of the housing, the release member extending through the opening in the sidewall of the housing and into the longitudinal bore of the housing, wherein the canopy support extends through the longitudinal bore in the housing, the canopy support having a first stop adjacent a first end of the canopy support and a second stop adjacent a second end of the canopy support, the connector secured adjacent the first end of the canopy support, wherein the canopy support is positionable in a first position with respect to the housing, the first stop being engaged by the release member in the first position, and wherein the canopy support is positionable in a second position with respect to the housing, the second stop being engaged by the release member in the second position.

According to another embodiment, the disclosed subject technology relates to a canopy assembly for a ride-on vehicle, comprising: a canopy having a receiver; and, a canopy frame assembly comprising: a housing connectable to a frame of the ride-on vehicle, the housing having bore therethrough, the frame of the ride-on vehicle having a cavity, wherein the housing is connected to the frame of the ride-on vehicle adjacent an opening to the cavity in the frame of the ride-on vehicle; a canopy support extending through the bore in the housing, the canopy support having a first stop adjacent a first end of the canopy support and a second stop adjacent a second end of the canopy support; a release member extending transversely into the bore of the housing, the release member biased toward a first position to separately engage the first stop and the second stop of the canopy support, the release member capable of being transitioned to a second position to disengage the first stop and the second stop; a connector secured to the first end of the canopy support to releasably engage the receiver of the canopy; and, a bushing connected to the second end of the canopy support, the bushing engaging an interior wall of the cavity of the frame to provide additional stability to the canopy support, wherein the canopy support is positionable in a first position with respect to the housing, the first stop being engaged by the release member in the first position, and wherein the canopy support is positionable in a second position with respect to the housing, the second stop being engaged by the release member in the second position.

According to another embodiment, the disclosed subject technology relates to a housing that is connected to the ride-on vehicle adjacent a cavity in a frame of the ride-on vehicle.

According to another embodiment, the disclosed subject technology relates to a canopy assembly, wherein the canopy has four receivers, and wherein the canopy frame assembly has four housings and four associated canopy supports, each of the four associated canopy supports having a separate connector to engage a separate one of the four receivers.

According to another embodiment, the disclosed subject technology relates to a canopy assembly wherein the canopy support comprises an elongated pole member.

According to another embodiment, the disclosed subject technology relates to a bushing connected to the second end of the canopy support, the bushing engaging an interior wall of the cavity of the frame to provide additional stability to the canopy support.

According to another embodiment, the disclosed subject technology relates to a canopy assembly wherein the connector has a supporting flange extending radially outwardly to support a portion of the canopy.

According to another embodiment, the disclosed subject technology relates to a canopy assembly wherein a portion of the release member extends out of an opening in the housing. In one embodiment, the release member is a push button. In an alternate embodiment, the release member has a protuberance to separately engage the first stop and the second stop on the canopy supports.

According to another embodiment, the disclosed subject technology relates to a bias member between the housing and the release member to bias the protuberance of the release member toward the canopy support.

According to another embodiment, the disclosed subject technology relates to a canopy for a canopy assembly, wherein the canopy has a planar portion, a skirt portion extending from the planar portion, and a spring steel element extending about the periphery of the planar portion adjacent a joint between the planar portion and the skirt portion.

According to another embodiment, the disclosed subject technology relates to a canopy that is releasably connected to the plurality of canopy supports.

According to another embodiment, the disclosed subject technology relates to a receiver connected to the canopy, the receiver having a mating member for releasably connecting the connector to the receiver, the connector further having a supporting flange extending radially outwardly to further support the canopy.

According to another embodiment, the disclosed subject technology relates to a canopy assembly having a plurality of receivers connected to the canopy, and a plurality of connectors, wherein one of the plurality of connectors is secured to the first end of each canopy support, and wherein each of the plurality of connectors secured to the plurality of canopy supports are releasably connectable to a different one of the plurality of receivers connected to the canopy.

According to another embodiment, the disclosed subject technology relates to a canopy assembly for a ride-on vehicle, comprising: a ride-on vehicle frame comprising a plurality of support tubes, each support tube having an opening to a longitudinal cavity in the interior of the support tube; and, a canopy frame assembly for connection to the ride-on vehicle frame, comprising: a plurality of housings, one of the plurality of housings for each of the plurality of support tubes of the ride-on vehicle frame, wherein the housings are connected to a separate one of the plurality of the support tubes of the ride-on vehicle frame adjacent the respective opening in the support tube, each housing having a release member; a plurality of canopy supports, one of the plurality of canopy supports for each of the plurality of housings, wherein each of the canopy supports extends through a separate one of the plurality of housings, each of the plurality of canopy supports further having a first stop adjacent a first end of the canopy support and a second stop adjacent a second end of the canopy support; and, wherein the release member for each of the plurality of housings is biased toward a first position to separately engage the first stop and the second stop of the canopy support in the housing, wherein the release member for each of the plurality of housings can be transitioned to a second position to disengage from the first stop and the second stop of the canopy support, wherein the plurality of canopy supports are separately positionable in a first position with respect to the housing, the first stop being engaged by the release member in the first position, and wherein the plurality of canopy supports are separately positionable in a second position with respect to the housing, the second stop being engaged by the release member in the second position.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
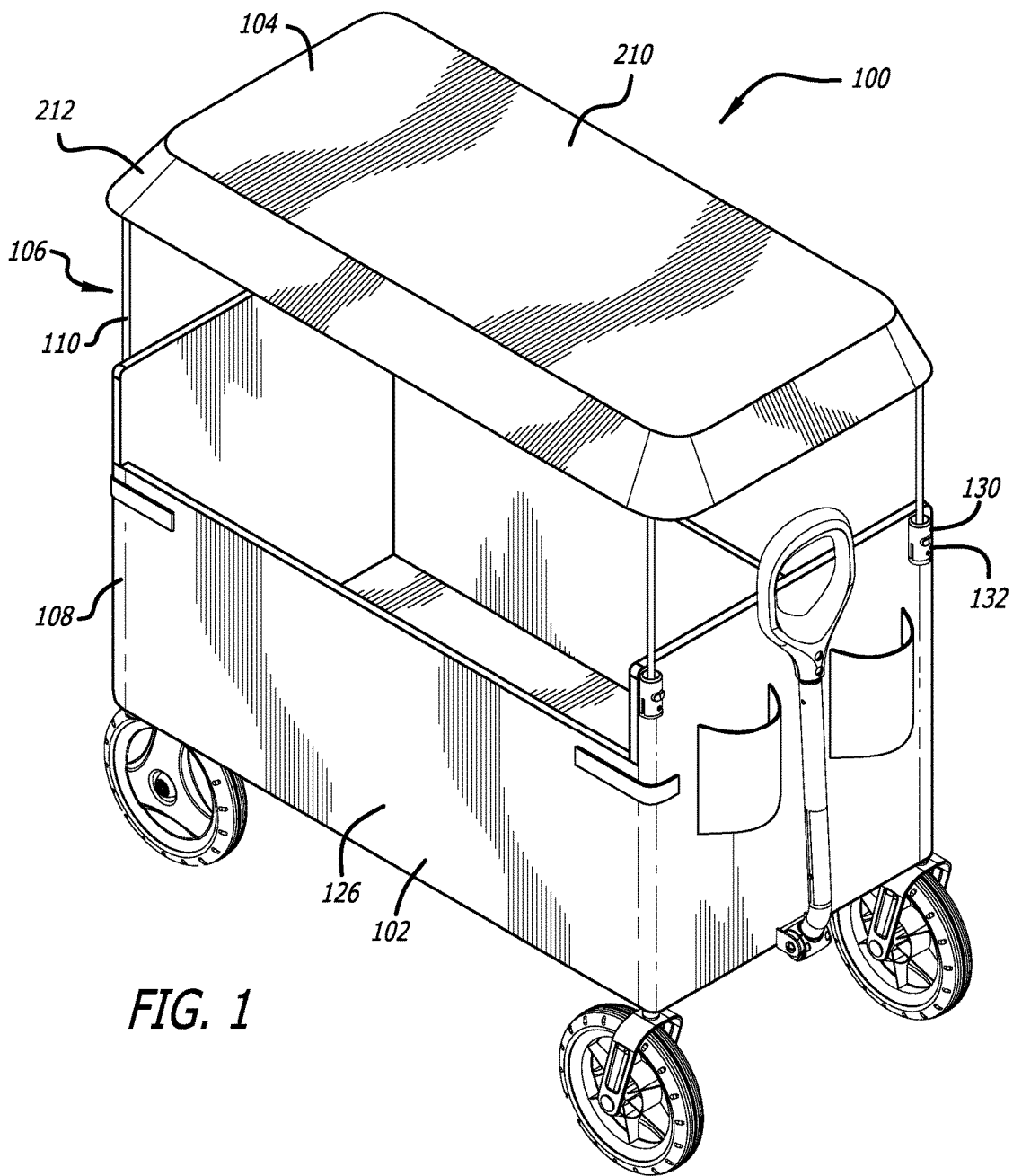
FIG. 1 is a perspective view of a foldable wagon according to one embodiment, showing one embodiment of a canopy assembly of the present disclosure.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Referring now to the figures, and specifically to FIG. 1, there is shown one embodiment of a canopy assembly 100 for a ride-on vehicle 102, such as a wagon 102. In one embodiment, the canopy assembly 100 generally comprises a canopy 104 and a canopy frame assembly 106. The canopy frame assembly 106 can be easily secured to the body or frame of the ride-on vehicle 102, including to a wagon body 108.

In prior art canopy assemblies, the supports for the canopy were typically connected to the ride-on vehicle frame when the canopy was desired to be utilized, and then the supports were removed from the ride-on vehicle frame when the canopy was no longer needed. In the present embodiment of the canopy assembly 100, however, the canopy frame assembly 106 has canopy supports 110 that can be transitioned between a retracted state (see FIGS. 2-4 and 6) and an extended or use state (see FIGS. 1 and 7) with respect to the frame or body 108 of the ride-on vehicle 102. Accordingly, the canopy supports 110 are not removed from the ride-on vehicle 102, and instead remain with the ride-on vehicle 102 at all times, including during periods of use of the canopy assembly 100 and during periods when the canopy assembly 100 is not needed. The canopy 104 can be connected and removed from the canopy supports 110 as described herein. In a preferred embodiment, four canopy supports 110 are utilized to removably support the canopy 104 of the canopy assembly 100.

Figure 2:
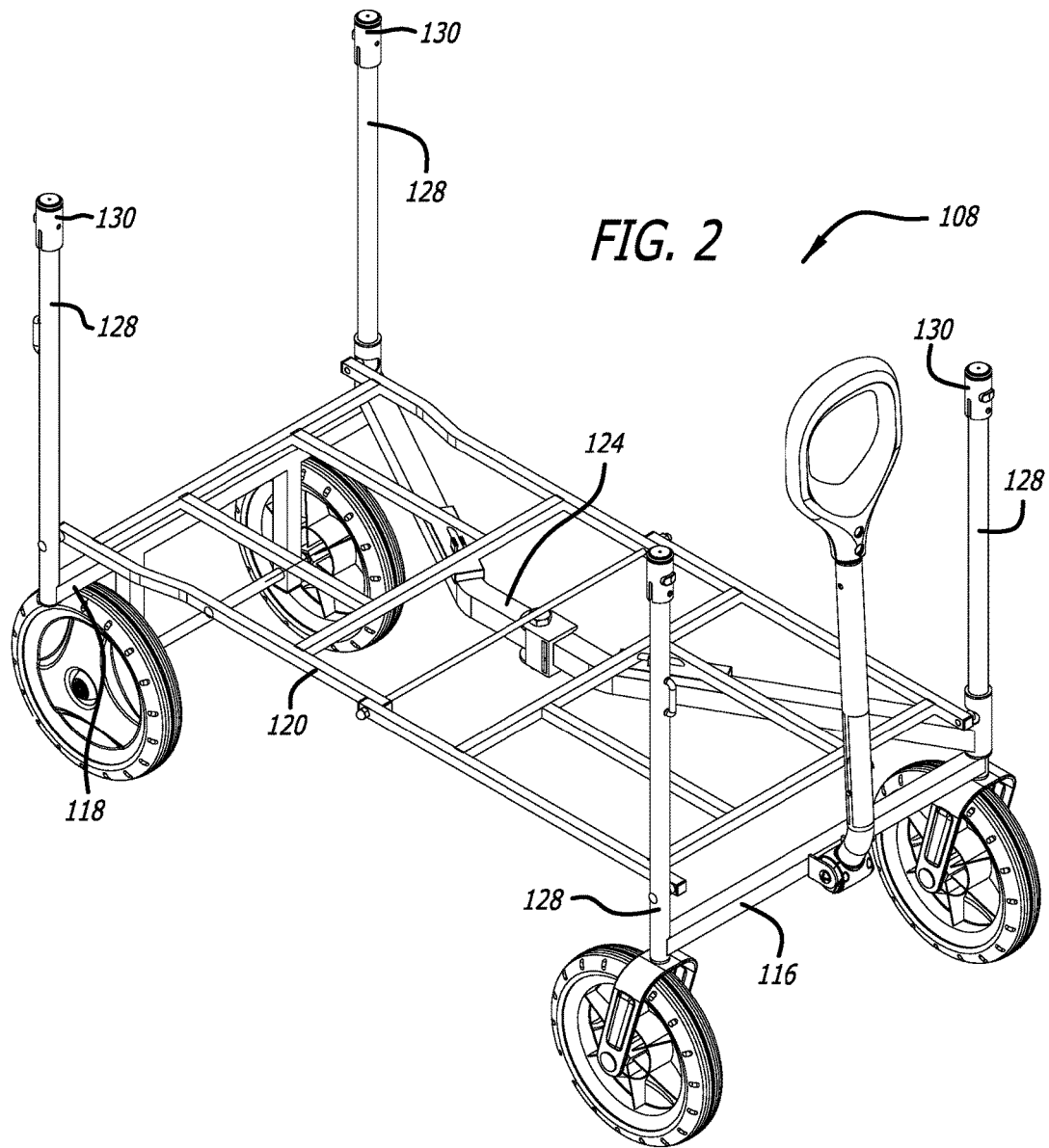
FIG. 2 is a perspective view of one embodiment of a foldable wagon frame having a canopy frame assembly of the present disclosure.
Figure 3:
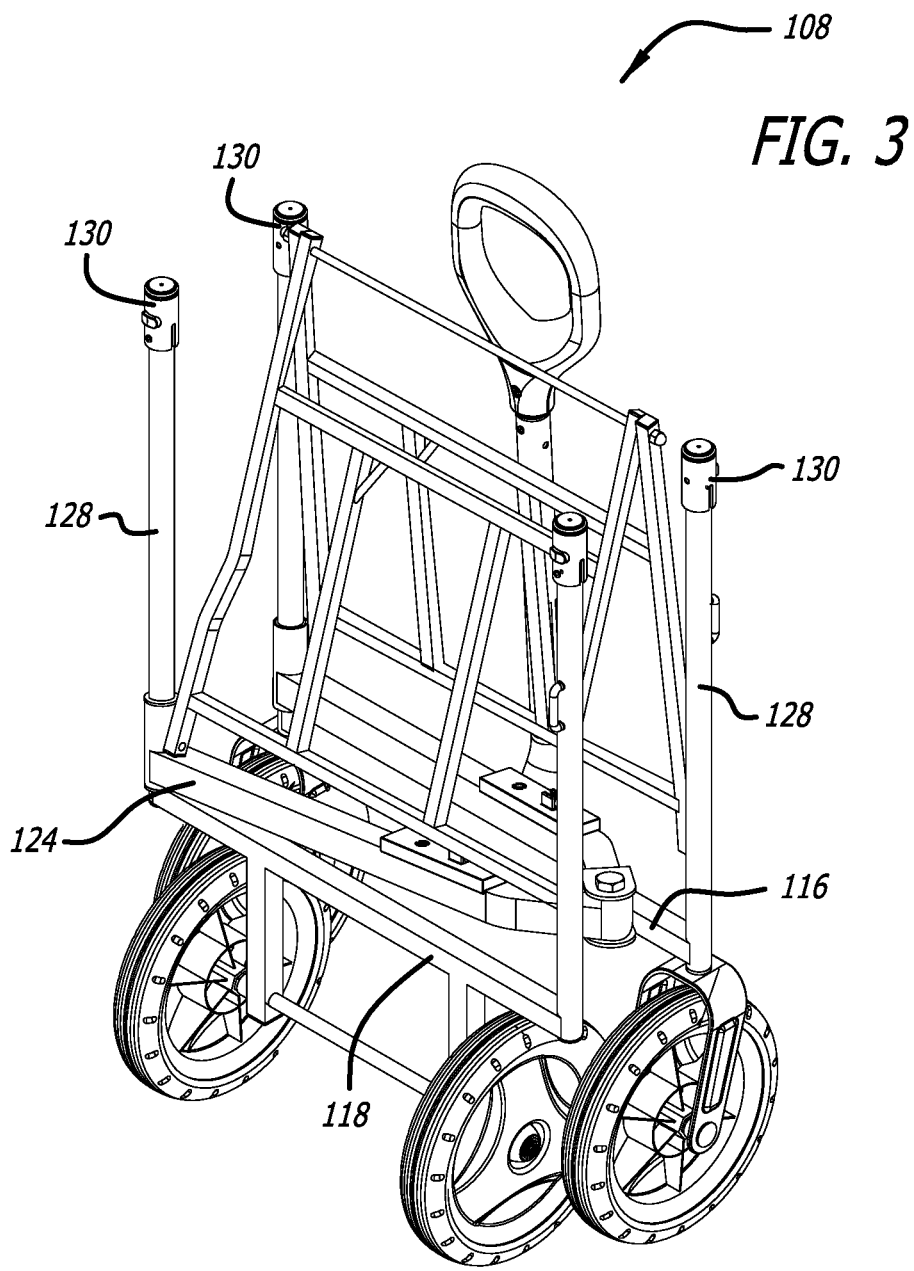
FIG. 3 is a perspective view of the foldable wagon frame having a canopy frame assembly of FIG. 2, showing the foldable wagon frame in the folded configuration.

As shown in FIGS. 1-3, in one embodiment the ride-on vehicle 102 may be a foldable wagon 102 that includes a collapsible frame assembly 108 as the wagon body 108. The collapsible frame assembly 108 may be moveable between an unfolded, open or use configuration as shown in FIGS. 1 and 2, and a closed, collapsed or folded configuration as shown in FIG. 3. The canopy frame assembly 106 can remain connected to the wagon 102 in both the open and folded configurations. In one embodiment, the wagon frame assembly 108 includes a first end assembly 116, an opposing second end assembly 118 opposing the first end assembly 116, a floor assembly 120 and a linkage assembly 124. Additionally, as shown in FIG. 1, the foldable wagon 102 may include a flexible housing 126 connected to the foldable frame assembly 108. In one embodiment, the wagon frame 108 includes vertical frame members 128 at each of the four opposing corners of the wagon frame 108. Accordingly, in one embodiment the wagon frame 108 has four vertical frame members 128. It is understood, however, that the canopy assembly 100 may be connected to other types of wagons that are not foldable, such as a wagon having a plastic, metal or wood wagon body 108, as well as other types of ride-on vehicles 102 that are not wagons 102.

Figure 6:
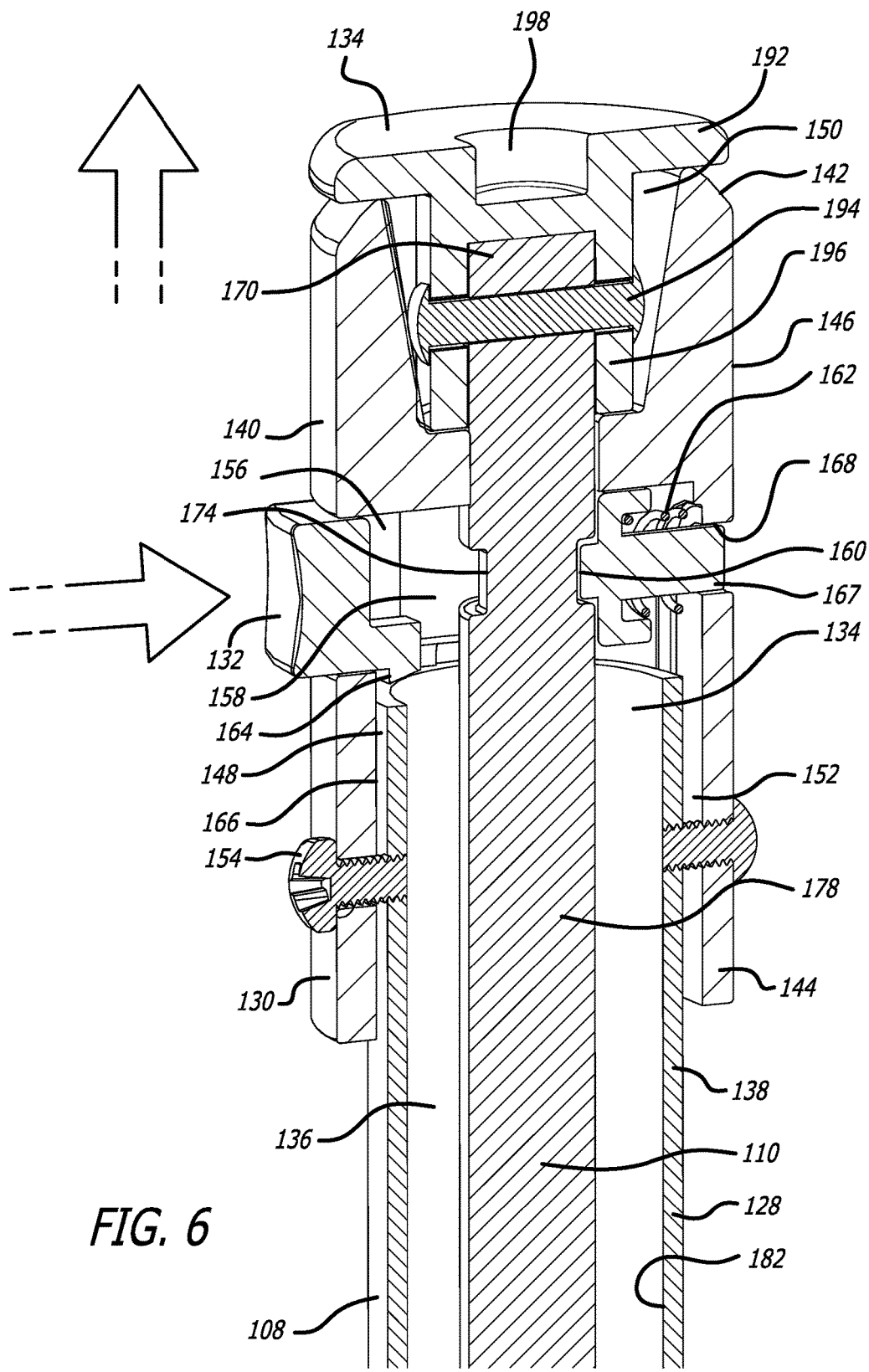
FIG. 6 is a cross-sectional perspective view of one embodiment of a canopy frame assembly with the canopy support in the retracted position.

As shown in FIG. 6, in a preferred embodiment the canopy frame assembly 102 generally comprises a housing 130, a release member 132 connected to the housing 130, a canopy support 110 extending through the housing 130, and a connector 134 connected to the canopy support 110. Additionally, in one embodiment, it is understood that four housings 130 are provided for the ride-on vehicle 102, including one housing 130 at each corner of the ride-on vehicle 102. And, with each housing 130, there is a corresponding release member 132, canopy support 110 and connector 134.

Figure 4:
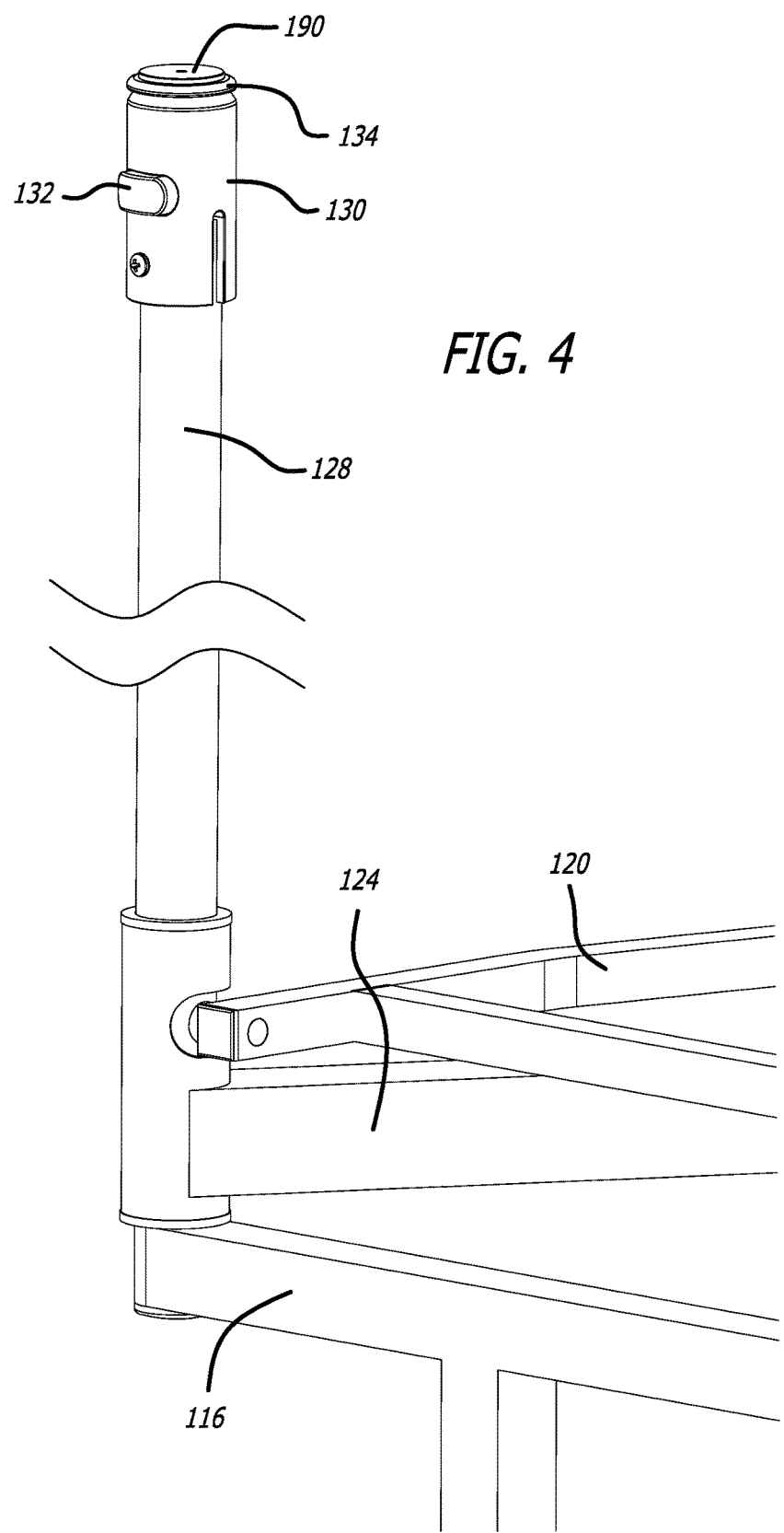
FIG. 4 is a partial perspective view of one embodiment of a canopy support for a wagon frame and a canopy frame assembly, with the canopy support in the retracted position.

Preferably, each canopy support 110 is received and retained by a housing 130. And, each housing 130 is preferably removably connected to the frame 108 of the ride-on vehicle 102. In one embodiment, as shown in FIGS. 4 and 6, each housing 130 is removably secured to the respective vertical frame member 128 of the ride-on vehicle frame 108, such as the wagon frame 108. Referring to FIG. 6, in one embodiment the vertical frame members 128 are tubular members, such as support tubes, having an outer wall 138 and an opening 134 to an inner longitudinal cavity 136 in the interior of the support tube 128. When a wagon body or frame is utilized without tubular frame members, the wagon body/frame will have a cavity to receive the canopy frame. Further, while each housing 130 is removably connected to the frame 108, it is preferred that once each respective housing 130 is attached to the frame 108 of the ride-on vehicle 102, that housing 130 remains with the ride-on vehicle 102 at all times and is not removed (similarly, the corresponding canopy support 110 remains with the frame 108 of the ride-on vehicle 102 at all times and is also not removed).

Figure 7:
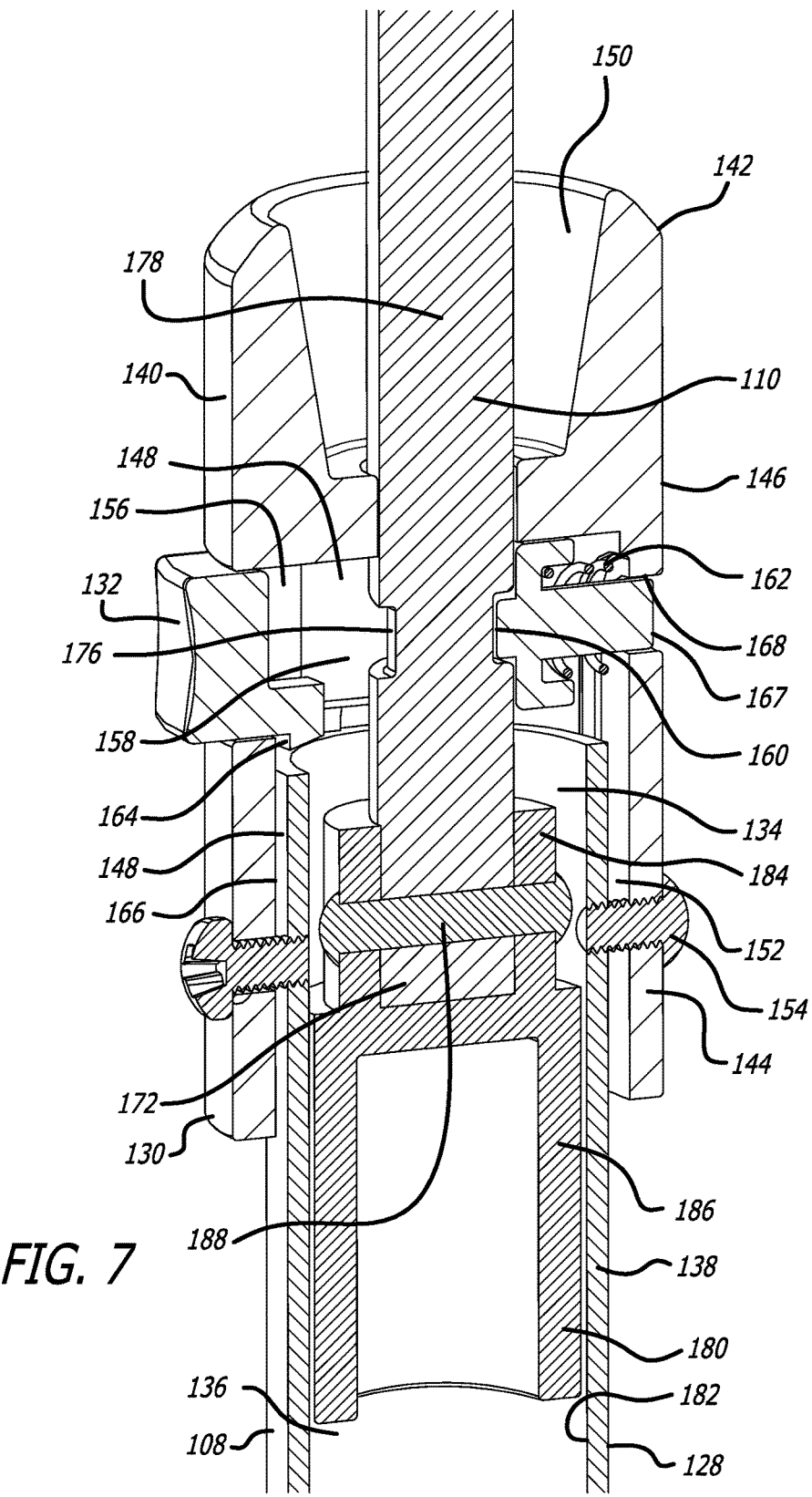
FIG. 7 is a cross-sectional perspective view of one embodiment of a canopy frame assembly with the canopy support in the extended position.

In one embodiment, the housing 130 is connectable to the body 108 of the ride-on vehicle 102, and is preferably connectable to the body 108 of the ride-on vehicle 102 adjacent the opening 134 to the cavity 136 in the frame 108 of the ride-on vehicle 102. The housing 130 preferably has a body 140 with a first end 142, a second end 144, and an outer sidewall 146. A longitudinal bore 148 extends through the housing 130 from the first end 142 to the second end 144. At the first end 142 the bore 148 has a larger opening 150 to accommodate the connector 134 of the canopy support 110 within the housing 130 during periods of non-use of the canopy assembly 100, as shown in FIGS. 2-4 and 6. In one embodiment the larger opening 150 may be tapered to provide a lead in for the connector 134. The portion of the bore 148 that provides the larger opening 150 is generally sized to be just larger than the canopy support 110. In one embodiment, the portion of the bore 148 at the second end 144 of the housing 130 also has a larger opening 152 to accept the vertical frame member 128 of the ride-on vehicle frame 108 for connecting the housing 130 to the vertical frame member 128. As shown in FIGS. 6 and 7, in one embodiment, to connect the housing 130 to the vertical frame member 128 a portion of the vertical frame member 128 extends into the larger opening 152 at the second end 144 of the housing 130. A fastener 154 is used to secure the housing 130 to the frame member 128.

As shown in FIGS. 4-7, the housing 130 may also have an opening 156 in the sidewall 146 to provide access to the release member 132 of the canopy frame assembly 106. In one embodiment the release member 132 is a push button member that extends transversely into the bore 148 of the housing 130. Additionally, a portion of the release member 132 at least partially extends out of the opening 156 in the sidewall 146 of the housing 130. Accordingly, as shown in FIG. 6, the release member 132 extends through the opening 156 and into the longitudinal bore 148 of the housing 130. The release member 132 has a generally central aperture 158 through which the canopy support 110 extends. The release member 132 also has a protuberance 160 that extends into the aperture 158 to engage the canopy support 110 as explained herein. Preferably, the release member 132 is biased toward the opening 156 in the sidewall 146 of the housing 130 by a biasing member 162, such as a spring 162. In one embodiment the biasing member 162 is located between the housing 130 and the release member 132 to bias the protuberance 160 of the release member 132 toward the canopy support 110, and preferably out of the opening 156 in the sidewall 146 of the housing 130. The release member 132 also has a flange 164 that engages the inner wall 166 of the longitudinal bore 148 to prevent the release member 132 from escaping out the opening 156 in the sidewall 146 of the housing 130. Finally, the release member 132 has an extension 167 at the end thereof that rides in an opposing opening 168 in the housing 130 to maintain the release member 132 aligned in the housing 130. In one embodiment, the bias member 162 is positioned around the extension 167 of the release member 132.

As explained above, the canopy assembly 100 preferably utilizes canopy supports 110 to support the canopy 104. The canopy supports 110 generally are elongated bodies 178 that have a first end 170 and an opposing second end 172. The canopy supports 110 are typically made of round stock, and the material may be plastic, aluminum, or any other generally rigid material. The canopy supports 110 further have a first stop 174 adjacent the first end 170 of the canopy support 110, and a second stop 176 adjacent the second end 172 of the canopy support 110. In one embodiment, the stops 170, 172 comprise grooves in the elongated body 178 that are engaged by the release member 132. Referring to FIGS. 6 and 7, the canopy supports 110 generally extend through the longitudinal bore 148 in the housing 130.

Additionally, as shown in FIG. 7, in one embodiment a bushing 180 is provided and is connected to the second end 172 of the canopy support 110. The bushing 180 preferably provides two functions. First, the bushing 180 assists in engaging an interior wall 182 of the cavity 136 of the ride-on vehicle 102 to provide additional support and stability to the canopy support 110. Second, the bushing 180 also operates as a stop to prevent the canopy support 110 from being removed from the housing 130 as the bushing 180 preferably cannot pass through or by the release member 132 in the housing 130. Referring to FIG. 7, in one embodiment the bushing 180 has a first portion 184 that receives the canopy support 110, and a second portion 186 that engages the interior wall 182 of the cavity 136. The canopy support 110 may be secured to the bushing 180 with a fastener 188, such as a rivet 188.

Figure 8:
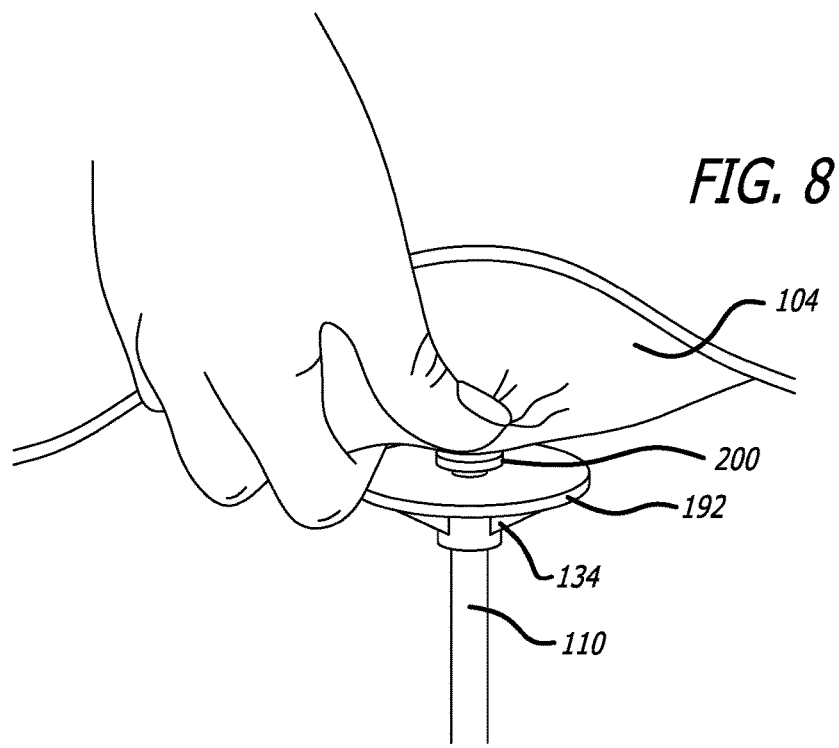
FIG. 8 is a partial perspective view of a connector of a canopy support being securely engaged to a receiver of the canopy of FIG. 1.

As shown in FIGS. 6-8, in accordance with the present disclosure, each canopy support 110 preferably includes a connector 134 at the first end 170 of the canopy support 110, and where the connector 134 is configured to mate with a receiver 190 of the canopy 104. In one embodiment, the connector 134 is a female component and the receiver 190 is a male snap receiver so that when connected together, the connector 134 and receiver 190 become removably coupled in a press-fit/snapping manner. It is understood, however, that the receiver 190 may be a female component and the connector 134 may be a male component. Additionally, alternate mating configurations are acceptable.

In a preferred embodiment, a flange 192 extends radially outwardly from the connector 134. The flange 192 provides increased surface area for supporting the canopy 104. In one embodiment, the connector 134 and flange 192 are integral, however, they may be separate components that are fixed together. Additionally, in a preferred embodiment the connector 134 and flange 192 are an integral component made of plastic. The connector 134 and flange 192 are secured to the first end 170 of the canopy support 110, and a rivet 194 may be used to secure the connector 134 and flange 192 to the canopy support 110. In one embodiment, the connector 134 has an extension 196 that is sized and shaped to receive the first end 170 of the canopy support 110.

Figure 9:
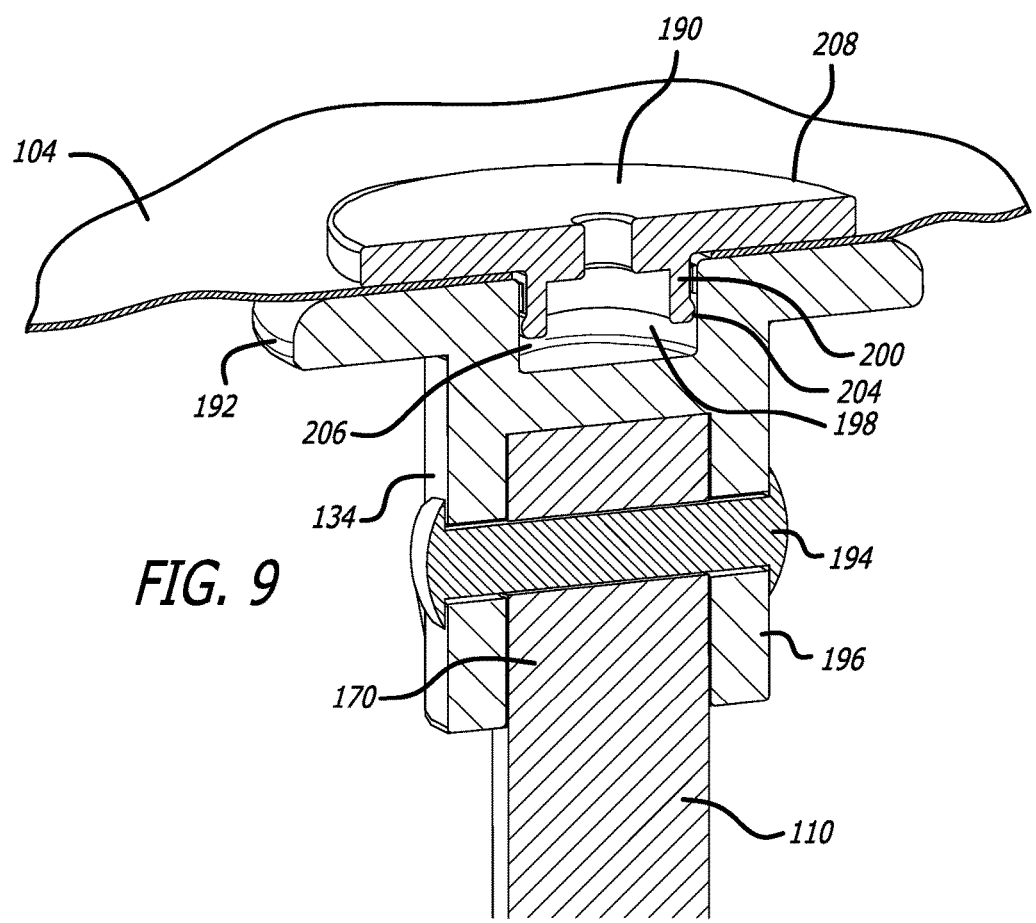
FIG. 9 is a cross sectional perspective view of the connector of the canopy support engaged to the receiver of the canopy of FIG. 8.

To make the mating connection between the connector 134 and the receiver 190, in one embodiment the connector 134 has a female opening 198 that engages the male protrusion 200 of the receiver 190. Additionally, the male protrusion 200 of the receiver may have an annular rib 204 that engages an annular depression 206 in the female opening 198 of the connector 134 in a snap fit manner as shown in FIGS. 8 and 9. While the connector 134 is shown as a female member that mates with a male receiver 190, the connector 134 may be a male member and the receiver 190 may be a female member. Additionally, alternate connection methods may be utilized, such as a threading engagement, pressure fit engagement, friction engagement, etc.

As shown in FIGS. 8 and 9, the mating receiver 190 is fixed in place on a bottom of the canopy 104. In one embodiment the receiver 190 includes a male protrusion 200 and an extending flange 208. The male protrusion 200 may be integral with the extending flange 208, or they may be separate parts connected together. As explained above, the male protrusion 200 may have an annular rib 204 to engage the annular depression 206 in the connector 134 for creating the snap fit engagement between the connector 134 and receiver 190.

Figure 10:
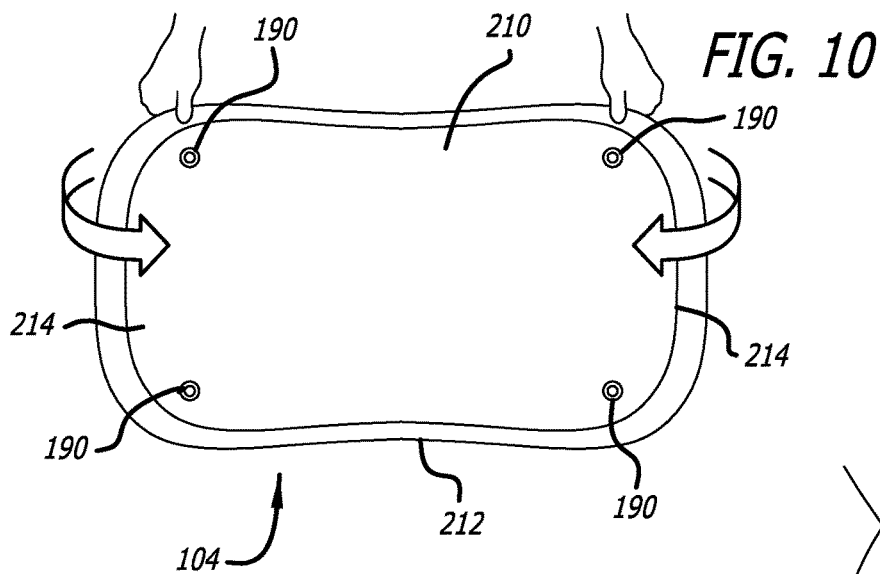
FIG. 10 is a perspective view of one embodiment of a canopy used with the canopy frame assembly.
Figure 11:
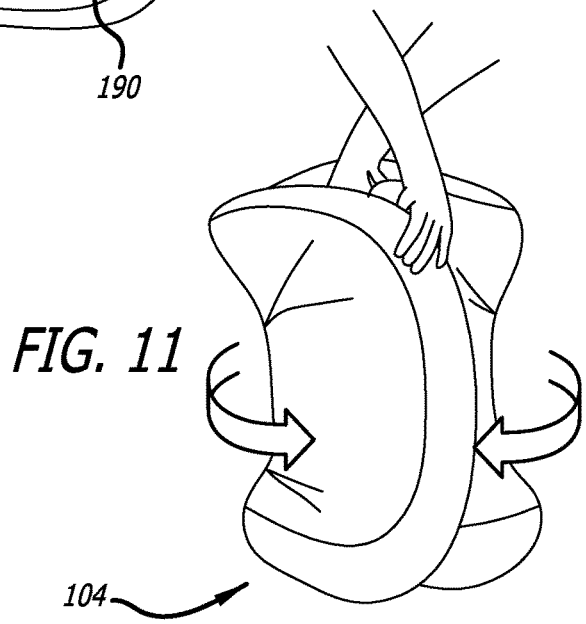
FIG. 11 is a perspective view of the canopy of FIG. 10 being folded.
Figure 12:
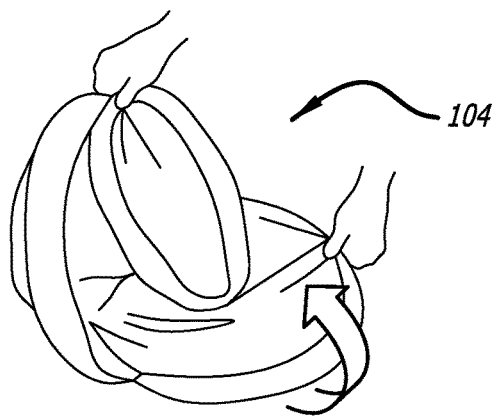
FIG. 12 is a perspective view of the canopy of FIG. 10 being further folded.
Figure 13:
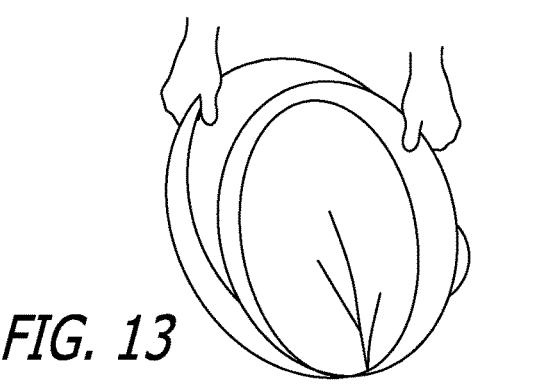
FIG. 13 is a perspective view of the canopy of FIG. 10 in a folded configuration.
Figure 14:
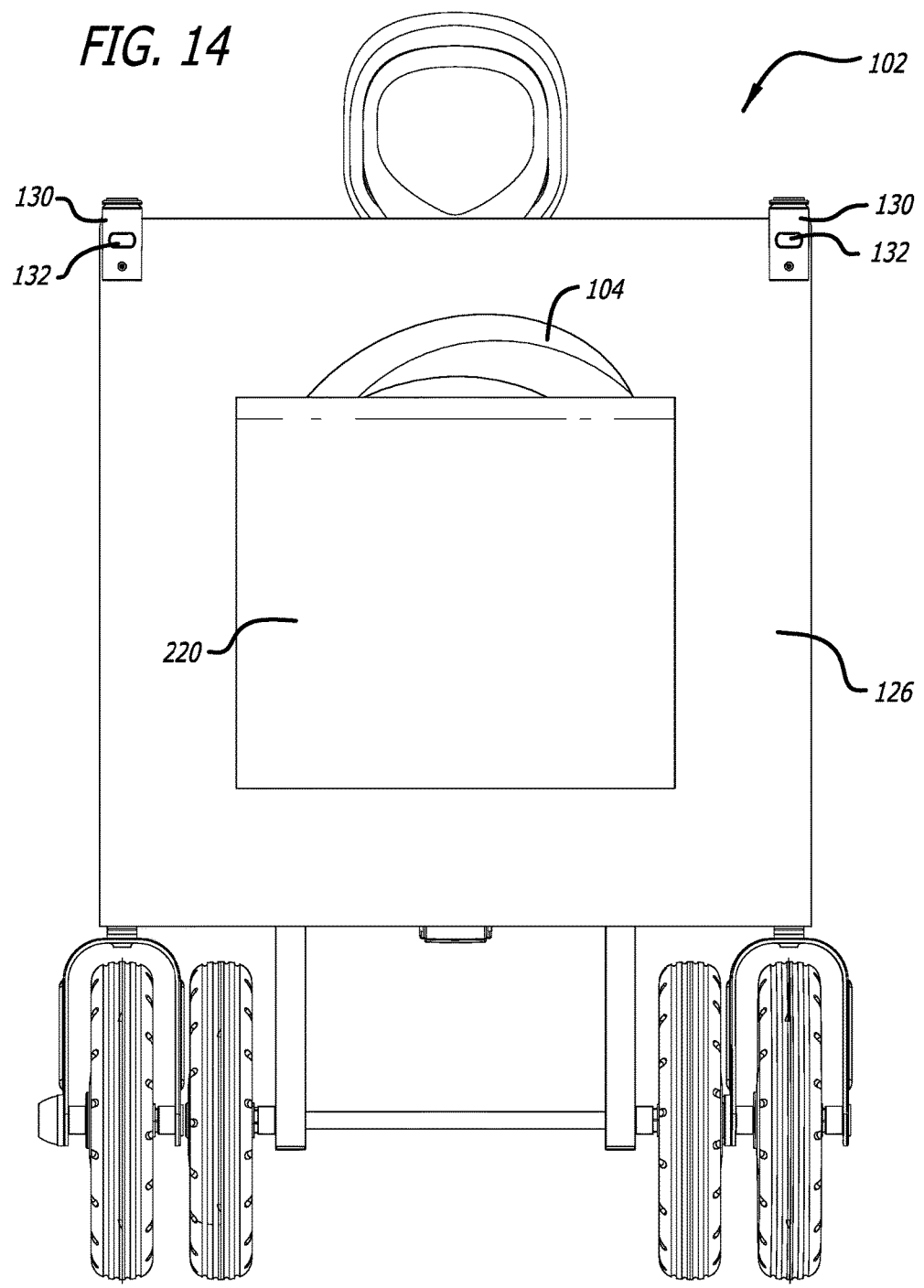
FIG. 14 is a rear view of a wagon having a pouch for retaining a folded canopy.

Additionally, the extending flange 208 of the snap receiver 190 preferably rests on the associated flange 192 of snap connector 134 to provide further support to the canopy 104 on the canopy supports 110. As shown in FIGS. 1, 2 and 10, each connector 134 on the canopy supports 110 has a corresponding mating receiver 190 in the canopy 104.

Referring now to FIGS. 1 and 10-13, the canopy 104 includes an elongated top 210 configured to cover ride-on vehicle 102, and a side skirt 212 that extends peripherally downward and hangs from elongated top 210. In one embodiment, elongated top 210 includes two rounded opposing ends 214. Canopy 104 further includes a spring steel element (not shown), which may be placed in a sleeve created at the joint between the elongated top 210 and the side skirt 212 of the canopy 104. The spring steel element provides structural stability to the canopy 104 and also allows for folding of the canopy 104 as described below and as shown in FIGS. 10-13. As shown in FIGS. 1 and 10, in a preferred embodiment canopy 104 has four snap receivers 190 connected thereto, each of which is positioned near one of its four corners, so as to be connected to the four canopy supports 110 extending from the housings 130 when canopy frame assembly 106 is secured to wagon body 108.

In accordance with the present disclosure, a spring steel element, which may be sewn into a sleeve between the elongated top 210 and the side skirt 212, is chosen so as to have a suitable strength that helps keep canopy 104 stretched out when in a unfolded arrangement, as shown in FIGS. 1 and 10. Due to the physical characteristics of the spring steel element, canopy 104 can be easily folded for storage and unfolded for use by coupling to the four canopy supports 110. As shown in FIGS. 10-13, a user can fold canopy 104 into a desirable arrangement by bending it lengthwise into a third of its length (i.e., substantially in two figure eights). During the folding process, as the left third portion of canopy 104 approaches the right third portion, the middle third portion will bend downwards to create a folded canopy 104 consisting of three sections on top of one another. Alternatively, canopy 104 can be folded in any other desirable arrangement, such as a single figure eight configuration, for example. The folded canopy 104 may be stored in a pouch 220 or pocket 220 in the ride-on vehicle body 108, including a pocket 220 in the flexible housing 126.

In accordance with the present disclosure, canopy 104 may be fabricated with materials that protect children sitting in wagon body 108 from the sun. Moreover, these materials are lightweight, strong, water and wind resistant, so as to provide protection from wind and rain.

Figure 5:
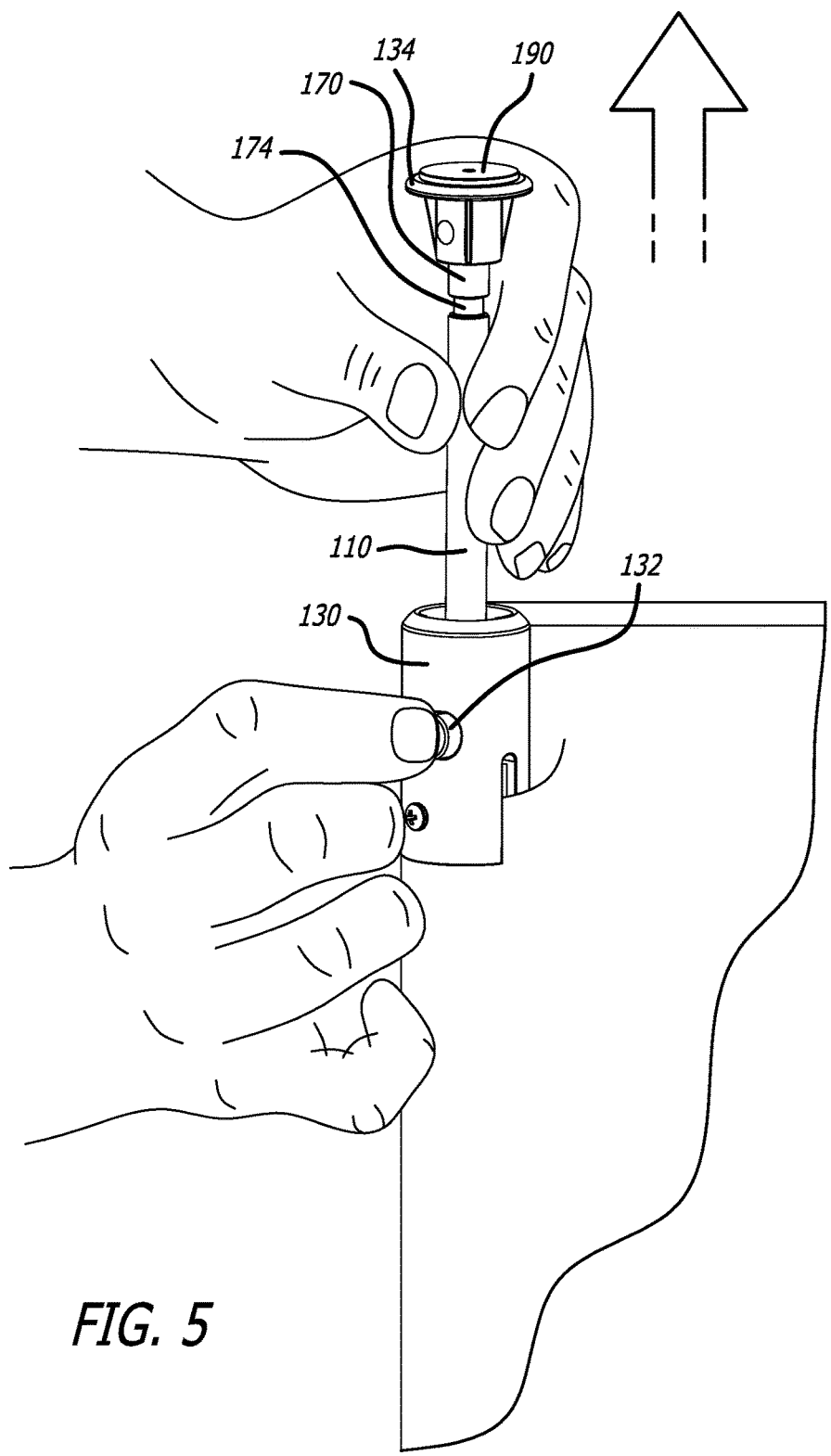
FIG. 5 is a perspective view of one embodiment of a canopy frame assembly for a wagon frame, with a user releasing the canopy support from the retracted position to allow for extending the canopy support to a use position.

Referring to FIGS. 1, 2 and 5-7, the canopy supports 110 can be positioned in two locked positions: a first or retracted position (see FIGS. 2 and 6) where the canopy supports 110 are in the down position and are located within the cavity 136 of the ride-on vehicle 102, and a second or use position (see FIGS. 1 and 7) where the canopy supports 110 are in the up position. As explained above, the canopy supports 110 have a first stop 174 adjacent the first end 170 of the canopy support. In the retracted position, the protuberance 160 of the release member 132 is biased by the spring 162 to engage the first stop 174 and retain the canopy support 110 in the lower position. When the release member 132 is biased into engagement with the first and second stops 174, 176, the release member 132 is in its first position with respect to the housing 130. The user can push the release member 132 inwardly with respect to the housing 130 to overcome the force of the spring member 162 as shown in FIG. 5. When the release member 132 is moved radially inwardly, the protuberance 160 of the release member 132 disengages from the first stop 174 and the canopy support 110 can be raised upwardly to support the canopy 104, or the protuberance 160 disengages from the second stop 176 and the canopy support 110 can be moved downardly into the cavity 136. At a point when the canopy support 110 is raised sufficiently upwardly and out of the cavity 136 of the ride-on vehicle 102, the protuberance 160 will come into engagement with the second stop 176 and will then be biased into its first position, but within the second stop 176. At this point the canopy support 110 will be in its use position as shown in FIGS. 1 and 7. It is understood that each canopy support 110 must be separately moved by manipulating the release member 132 and canopy support 110 at each separate housing 130 of the ride-on vehicle 102. Further, it is similarly understood that each canopy support 110 is separably positionable in its first or stored position with respect to the housing 130, wherein the first stop 170 adjacent the first end 170 of the canopy support 110 is engaged by the protuberance 160 of the release member 132, and that each canopy support 110 is separably positionable in its use or second position with respect to the housing 130, wherein the second stop 176 adjacent the second end 172 of the canopy support 110 is engaged by the protuberance 160 of the release member 132. Because each release member 132 is biased toward the canopy supports 110, the release member 132 will remain engaged by the first or second stops 174, 176, depending on where the canopy support 110 is positioned, until the user depresses the release member 132 to disengage the release member 132 from the respective first or second stop 174, 176. At the point when the protuberance 160 is not engaged with the first stop 174 or the second stop 176 because the release member 132 has been depressed with sufficient force by the user to overcome the spring force, the release member 132 is positioned in its second position and the canopy support 110 can be moved upwardly or downwardly, as desired. However, it is understood that the force of the spring 162 on the release member 132 operates to bias the release member 132 toward the first position unless the spring force is overcome to transition the release member 132 to the second position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A canopy assembly for a ride-on vehicle, comprising:
   a canopy having a receiver; and,
   a canopy frame assembly comprising:
      a housing connectable to a frame of the ride-on vehicle, the housing having bore therethrough, the frame of the ride-on vehicle having a cavity, wherein the housing is connected to the frame of the ride-on vehicle adjacent an opening to the cavity in the frame of the ride-on vehicle;
      a canopy support extending through the bore in the housing, the canopy support having a first stop adjacent a first end of the canopy support and a second stop adjacent a second end of the canopy support;
      a release member extending transversely into the bore of the housing, the release member biased, by a bias member positioned within the bore, toward a first position to separately engage the first stop and the second stop of the canopy support, the release member capable of being transitioned to a second position to disengage the first stop and the second stop;

a connector secured to the first end of the canopy support to releasably engage the receiver of the canopy; and, a bushing connected to the second end of the canopy support, the bushing engaging an interior wall of the cavity of the frame to provide additional stability to the canopy support, wherein the canopy support is positionable in a first position with respect to the housing, the first stop being engaged by the release member in the first position, and wherein the canopy support is positionable in a second position with respect to the housing, the second stop being engaged by the release member in the second position.

2. The canopy assembly of claim 1, wherein the canopy has four receivers, and wherein the canopy frame assembly has four housings and four associated canopy supports, each of the four associated canopy supports having a separate connector to engage a separate one of the four receivers.

3. The canopy assembly of claim 1, wherein a portion of the release member extends out of an opening in the housing.

4. The canopy assembly of claim 1, wherein the release member is a push button.

5. The canopy assembly of claim 1, wherein the release member has a protuberance to separately engage the first stop and the second stop.

6. The canopy assembly of claim 1, wherein the canopy has a planar portion, a skirt portion extending from the planar portion, and a spring steel element extending about the periphery of the planar portion adjacent a joint between the planar portion and the skirt portion.

7. The canopy assembly of claim 1, wherein the canopy support comprises an elongated pole member.

8. The canopy assembly of claim 1, wherein the connector has a supporting flange extending radially outwardly to support a portion of the canopy.

9. A canopy assembly for a ride-on vehicle, comprising:
a ride-on vehicle frame comprising a plurality of support tubes, each support tube having an opening to a longitudinal cavity in the interior of the support tube; and,
a canopy frame assembly for connection to the ride-on vehicle frame, comprising:
  a plurality of housings, one of the plurality of housings for each of the plurality of support tubes of the ride-on vehicle frame, wherein the housings are connected to a separate one of the plurality of the support tubes of the ride-on vehicle frame adjacent the respective opening in the support tube, each housing having a release member;
  a plurality of canopy supports, one of the plurality of canopy supports for each of the plurality of housings, wherein each of the canopy supports extends through a separate bore in a separate one of the plurality of housings, each of the plurality of canopy supports further having a first stop adjacent a first end of the canopy support and a second stop adjacent a second end of the canopy support; and,
  wherein the release member for each of the plurality of housings is biased toward a first position to separately engage the first stop and the second stop of the canopy support in the housing, each of the release members being biased towards the first position and second position by a bias member disposed within the bore of the housing, wherein the release member for each of the plurality of housings can be transitioned to a second position to disengage from the first stop and the second stop of the canopy support, wherein the plurality of canopy supports are separately positionable in a first position with respect to the housing, the first stop being engaged by the release member in the first position, and wherein the plurality of canopy supports are separately positionable in a second position with respect to the housing, the second stop being engaged by the release member in the second position.

10. The canopy assembly of claim 9, further comprising a canopy that is releasably connected to the plurality of canopy supports.

11. The canopy assembly of claim 10, further comprising a plurality of receivers connected to the canopy, and a plurality of connectors, wherein one of the plurality of connectors is secured to the first end of each canopy support, and wherein each of the plurality of connectors secured to the plurality of canopy supports are releasably connectable to a different one of the plurality of receivers connected to the canopy.

12. The canopy assembly of claim 10, wherein the canopy has a planar portion, a skirt portion extending from the planar portion, and a spring steel element extending about the periphery of the planar portion adjacent a joint between the planar portion and the skirt portion.

13. The canopy assembly of claim 9, further comprising a bushing connected to the second end of the canopy support, the bushing engaging an interior wall of the cavity of the frame to provide additional stability to the canopy support.

14. The canopy assembly of claim 9, wherein a portion of the release member for each housing extends out of an opening in the housing.

15. The canopy assembly of claim 9, wherein the release member is a push button.

16. A canopy assembly for a ride-on vehicle, comprising:
a canopy; and,
a canopy frame assembly comprising a housing, a release member connected to the housing, a canopy support extending through the housing, and a connector connected to the canopy support, wherein the housing has a first end and a second end, and a longitudinal bore extending through the housing from the first end to the second end, wherein the housing has an opening in a sidewall of the housing, the release member extending through the opening in the sidewall of the housing and into the longitudinal bore of the housing, wherein the canopy support extends through the longitudinal bore in the housing, the canopy support having a first stop adjacent a first end of the canopy support and a second stop adjacent a second end of the canopy support, the connector secured adjacent the first end of the canopy support, wherein the canopy support is positionable in a first position with respect to the housing, the first stop being engaged by the release member in the first position, and wherein the canopy support is positionable in a second position with respect to the housing, the second stop being engaged by the release member in the second position, the release member including a central aperture through which the canopy support extends.

17. The canopy assembly of claim 16, wherein the release member has a protuberance to separately engage the first stop and the second stop of the canopy support.

18. The canopy assembly of claim 17, further comprising a bias member between the housing and the release member to bias the protuberance of the release member toward the canopy support.

19. The canopy assembly of claim 16, wherein the housing is connected to the ride-on vehicle adjacent a cavity in a frame of the ride-on vehicle, and further comprising a bushing connected to the second end of the canopy support, the bushing engaging an interior wall of the cavity of the ride-on vehicle to provide additional stability to the canopy support.

20. The canopy assembly of claim 16, further comprising a receiver connected to the canopy, the receiver having a mating member for releasably connecting the connector to the receiver, the connector further having a supporting flange extending radially outwardly to further support the canopy.

* * * * *